Patented Feb. 7, 1950

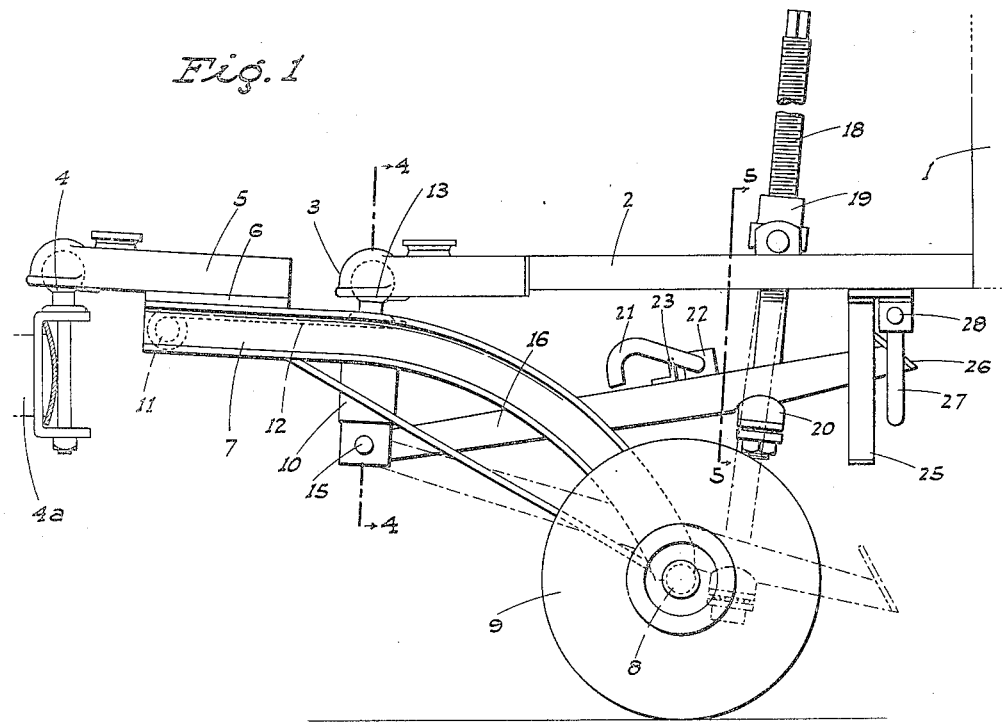
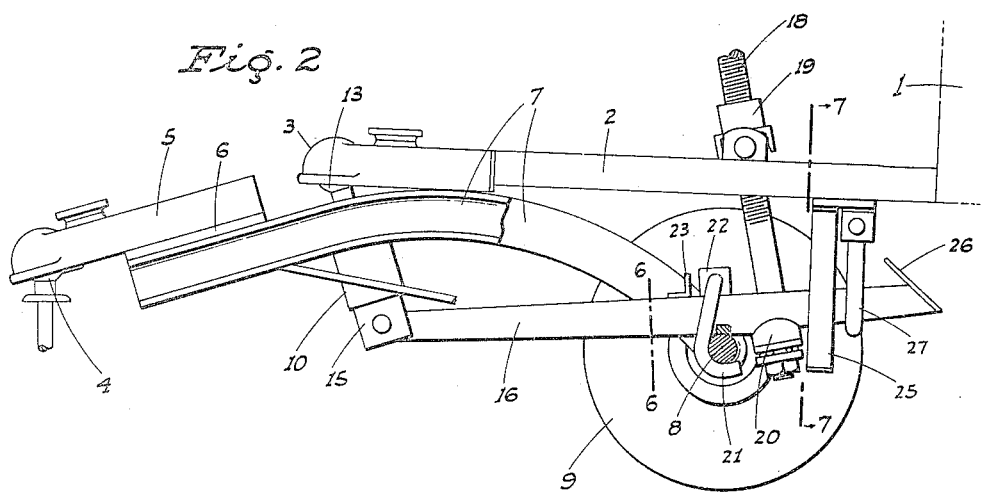
INVENTOR.
Coy W. Bayes
BY
[signature]
ATTYS

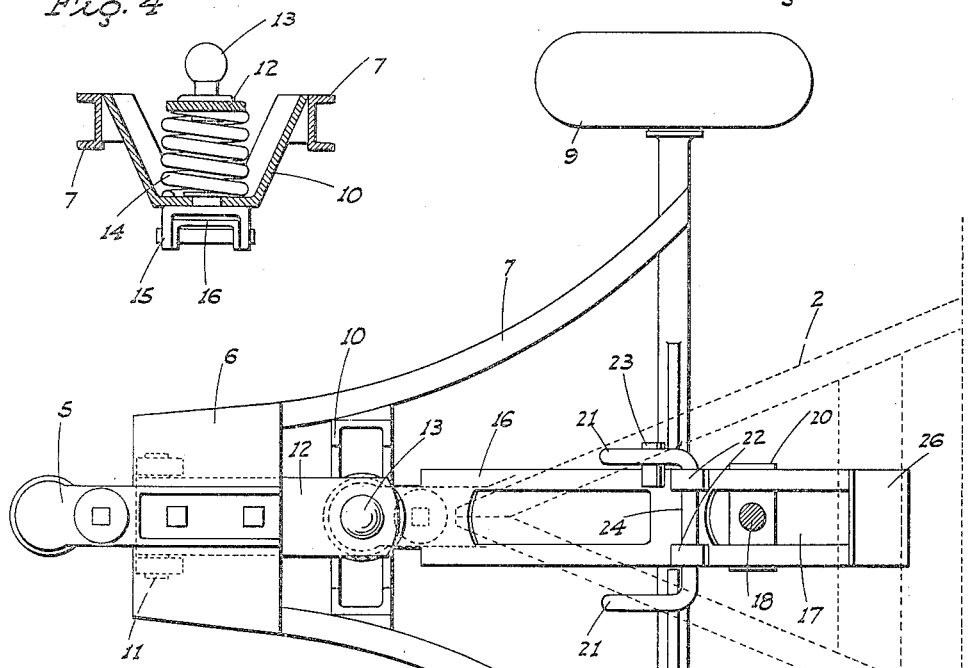
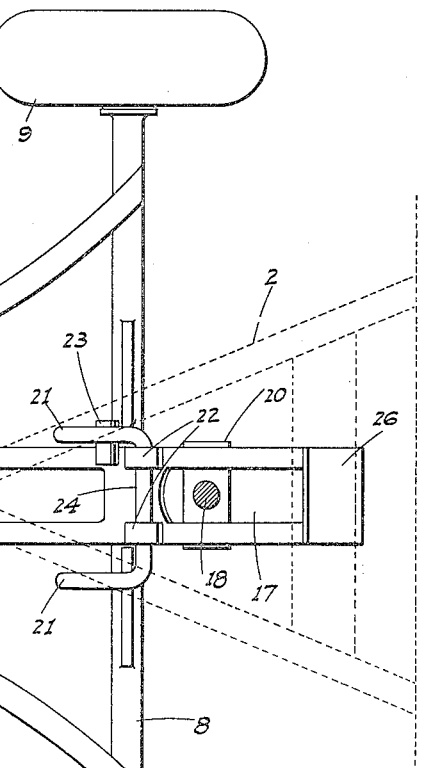
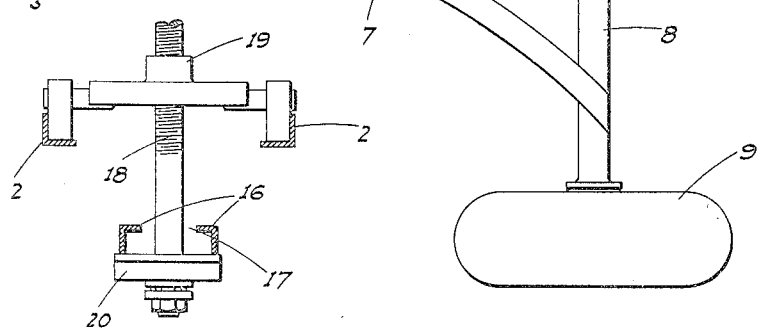
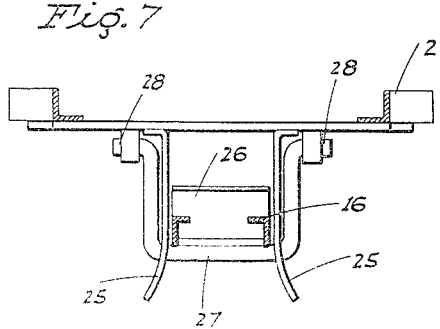
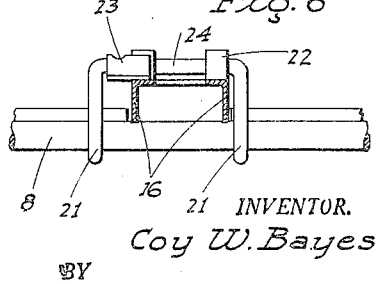

2,496,515

UNITED STATES PATENT OFFICE 2,496,515

RETRACTABLE TRAILER DOLLY

Coy W. Bayes, Stockton, Calif.

Application October 5, 1946, Serial No. 701,517

8 Claims. (Cl. 280—33.4)

This invention relates to the hitch mechanism interposed between a trailer and an automotive tow car or the like.

The primary object of the invention is to provide a dolly which is so designed and built as to carry and support a portion of the weight of the trailer, and in which the weight is distributed approximately midway between the tow car bumper hitch and the axle of the dolly.

A further object of the invention is to provide a spring suspension means between the trailer hitch and the dolly so as to allow the trailer to ride smoothly and easily and relieve the tow car of undue strains.

A still further object of the invention is to provide a means for raising the dolly entirely clear of the road and locking it in rigid position between the trailer hitch and the tow car hitch units, to thereby form a rigid coupling between the tow car and trailer which will then allow the trailer to be backed without the dolly cutting around or jackknifing.

Also a feature of advantage in providing a means for raising the dolly clear of the road and locking it rigid between the trailer and tow car is that should one of the tires on the dolly become flat the same may be raised from the road and the tow car and trailer continue on the way.

Likewise, the dolly can be raised while traveling over rough roads or in mud, snow, or in climbing steep grades, thus allowing the weight of the trailer to rest on the tow car and give more traction to the tow car under such conditions.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the dolly showing it in position between the tow car and trailer, and with its wheels resting on the ground.

Fig. 2 is a similar view showing the dolly wheels raised from contact with the ground and the dolly locked rigid between the trailer hitch and the tow car hitch.

Fig. 3 is a top plan view of the dolly.

Fig. 4 is a sectional view on line 4—4 of Fig. 1.

Fig. 5 is a fragmentary view, in section, taken on line 5—5 of Fig. 1.

Fig. 6 is a fragmentary sectional view taken on a line 6—6 of Fig. 2.

Fig. 7 is a fragmentary sectional view taken on a line 7—7 of Fig. 2.

Referring now more particularly to the characters of reference on the drawings, the numeral 1 designates the trailer having the usual projecting tongue 2, on the outer end of which is the female member 3 of a hitch of any conventional design, preferably of the ball and socket type.

The numeral 4 designates the male element of a conventional hitch, which is connected in any usual manner to the tow car 4a.

The improved dolly structure comprises the female part of the hitch 5 which cooperates with the element 4. This part 5 is rigidly secured on a plate 6 which projects laterally to each side of the member 5. Fixed to the outer edges of the plate 6 are a pair of diverging draft bars 7, which at their outer ends are fixed to and support the dolly axle 8 on which are mounted the dolly wheels 9.

Projecting between the bars 7 at a point substantially midway of the outer end of the member 5 and the axle 8 is a bracket 10 rigidly fixed to said arms and projecting therebelow.

Pivoted between the bars 7 at their outer ends, as at 11, is a relatively flat bar 12, on the outer end of which is the male member 13 which cooperates with the female member 3 of the hitch on the trailer tongue 2.

On the outer end of the bar 12 immediately below the member 13 is a coil spring 14 which, at its lower end, rests on the bottom of the bracket 10, so that there is a spring suspension between the hitch connected to the trailer and the arms 7 of the dolly.

Pivoted to the under side of the bracket 10, as at 15, is a reach bar 16 which projects rearwardly of the wheels 8. Adjacent its rear end the bar 16 is provided with a slot 17 through which a screw 18 projects. The screw 18 is mounted for up and down movement through a swivel collar 19 mounted on the tongue 2, and on its lower end is provided with a flanged plate 20 on which the bar 16 is normally held in elevated position when the wheels 8 are on the ground.

A double hook 21 is turnably mounted in ears 22 fixed on the top of the bar 16 immediately forwardly of the screw 18, and is normally held in upward position through engagement with a lug 23 also fixed on the top of the bar 16. The pintle pin 24 of the double hook 21 is shiftable laterally so as to relieve the hook 21 from its engagement with the lug 23 to allow the hook to drop downwardly to a vertical position for the purpose as will presently appear.

When the dolly is in use the parts appear as shown in full lines in Fig. 1, at which time the wheels 9 are on the ground and the weight of the trailer is spring suspended on the spring 14, throwing the weight of the trailer on the wheels of the dolly midway between such wheels and the tow car. There is thus an equalized suspension, which causes the trailer to ride easily along with the tow car and without undue strain on either the trailer or tow car.

When for any reason it is desired to lift the wheels 9 off of the ground for the attainment of the various objects of the invention as set forth in the preamble to this specification, the following operation is carried out:

The screw 18 is operated to lower the flanged plate 20, and consequently the bar 16, to the position shown by dotted lines in Fig. 1. When this position is reached the hook 22 is shifted laterally to relieve it from its engagement with the lug 23 and allow it to drop about the axle 8, as shown in Fig. 2. Thereupon, the motion of the screw 18 is reversed, and with this reversal of movement the hooks 21 lift the axle 8 upwardly and carry the wheels 9 off of the ground; the entire dolly unit then swinging about the hitch parts 4—5 as a pivot. This action is continued until the wheels are raised to a desired height, as shown generally in Fig. 2.

As the bar 16 raises it is free to move between spring guides 25 depending from the under side of the tongue 2, which tends to center and hold the bar 16 in its proper longitudinal position relative to the line of draft. Co-incidentally with this movement an inclined plate 26 at the outer end of the bar 16 engages a swinging yoke 27 which is pivotally mounted, as at 28, on the under side of the tongue 2, and normally hanging in the line of travel of the bar 16. The engagement of the plate 26 with the yoke 27 swings the latter out of the way of the bar 16 as the same is raised.

After the bar 16 has reached a certain height, however, the yoke 17 drops by gravity over the end of the bar 16. The screw 18 is then again operated to allow the bar 16 to move down into engagement with the bottom of the yoke 27, which, together with the spring bars 25, will hold the parts against any loose play and rattling.

When it is desired to do away with the use of the dolly the flanged plate 20 may be turned relative to the screw 18 and the bar 16 may then be dropped from engagement therewith; the flanged plate 20 then moving through the slot 17. The member 5 may then be disassociated from the member 4, and the member 3 may be disassociated from the member 13 and mounted over the member 4, thus connecting the tongue 2 directly with the tow car, and the dolly unit may be removed to any desired point.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. In combination with a tow car and a trailer, the latter including a draft tongue; a dolly unit, such unit including a rigid draft frame curving downwardly at its rear end and ground engaging wheels journaled at the rear end of the frame and supporting the same, said frame being pivotally connected to the tow car and to the draft tongue on the trailer, and means mounted on said tongue and operable for connection with the draft frame and to swing the latter upwardly to raise the wheels from the ground.

2. In combination with a tow car and a trailer, the latter including a draft tongue; a dolly unit, such unit including a rigid draft frame, curving downwardly at its rear end, and ground engaging wheels journaled at the rear end of the frame and supporting the same, means pivotally connecting the forward end of the draft frame with the tow car, means pivotally connecting the draft frame intermediate its ends with the tongue of the trailer, and means carried by the trailer tongue and operable to raise the draft frame relative to the trailer tongue.

3. A combination as in claim 2 in which the last named means includes a screw movable substantially vertically through the trailer tongue, and means for connection between the lower end of the screw and the draft frame whereby the draft frame may be swung upwardly with vertical movement of the screw.

4. A combination as in claim 2 in which the connection between the draft frame and trailer tongue includes a spring suspension means.

5. In combination with a tow car and a trailer, the latter including a draft tongue; a dolly unit, such unit including a wheel supported draft frame, a hitch at the outer end of the draft frame for connection with the tow car and a hitch intermediate the ends of the draft frame for connection with the tongue of the trailer, a reach bar pivoted for swinging movement on the frame and projecting to the rear of said wheels, a screw mounted for vertical movement through the tongue of the trailer, means at the bottom of the screw engaging the reach bar and normally holding the latter in elevated position, the screw being operable to lower said bar, and means on the bar engageable with the wheel axis of the dolly when the reach bar is lowered, whereby when the screw is operated to again raise the reach bar the latter will swing the draft frame about its connection with the tow car as an axis and lift the wheels from the ground.

6. A combination as in claim 5 including spaced apart spring guides on the trailer tongue between which the outer end of the reach rod extends when said rod is in elevated position.

7. A combination as in claim 5 and including a swinging yoke on the trailer tongue and operable to swing over the reach rod as the latter moves to elevated position.

8. In combination with a tow car and a trailer, the latter including a draft tongue; a dolly unit, such unit including a rigid draft frame curving downwardly at its rear end, ground engaging wheels journaled at the rear end of the frame and supporting the same, a hitch between the forward end of the frame and the tow car, a bar pivoted to the frame adjacent its front end and extending rearwardly therefrom, a hitch between the rear end of the bar and the trailer tongue, and a compression spring between the rear end of the bar and the frame.

COY W. BAYES.

REFERENCES CITED

The following references are of record in the file of this patent:

UNITED STATES PATENTS

| Number | Name | Date |
|---|---|---|
| 2,410,241 | Schramm | Oct. 29, 1946 |